United States Patent
Chun et al.

(10) Patent No.: US 11,962,873 B2
(45) Date of Patent: Apr. 16, 2024

(54) ADVERTISEMENT ANALYSIS SYSTEM AND METHOD FOR SPORTS BROADCASTING VIDEO USING ARTIFICIAL INTELLIGENCE

(71) Applicant: LAONBUD CO.,LTD., Suwon-si (KR)

(72) Inventors: Se Uk Chun, Suwon-si (KR); Jong Heon Kim, Suwon-si (KR)

(73) Assignee: LAONBUD CO., LTD., Suwon-si (KR)

( * ) Notice: Subject to any disclaimer, the term of this patent is extended or adjusted under 35 U.S.C. 154(b) by 0 days.

(21) Appl. No.: 17/914,756

(22) PCT Filed: Feb. 15, 2021

(86) PCT No.: PCT/KR2021/001927
§ 371 (c)(1),
(2) Date: Sep. 26, 2022

(87) PCT Pub. No.: WO2021/194090
PCT Pub. Date: Sep. 30, 2021

(65) Prior Publication Data
US 2023/0353839 A1 Nov. 2, 2023

(30) Foreign Application Priority Data
Mar. 27, 2020 (KR) .................. 10-2020-0037211

(51) Int. Cl.
*H04N 21/81* (2011.01)
*H04N 21/234* (2011.01)
*H04N 21/24* (2011.01)

(52) U.S. Cl.
CPC ..... *H04N 21/812* (2013.01); *H04N 21/23418* (2013.01); *H04N 21/2407* (2013.01)

(58) Field of Classification Search
CPC ........... H04N 21/812; H04N 21/23418; H04N 21/2407
See application file for complete search history.

(56) References Cited

U.S. PATENT DOCUMENTS 9,239,958 B2* 1/2016 Deng ................ G06V 20/40
2006/0174261 A1* 8/2006 Cline, Jr. ............ H04N 21/812
725/19
(Continued)

FOREIGN PATENT DOCUMENTS

KR 10-2000-0054328 A 9/2000
KR 10-2001-0025404 A 4/2001
(Continued)

OTHER PUBLICATIONS

International Search Report for PCT/KR2021/001927 dated Jun. 18, 2021 from Korean Intellectual Property Office.

Primary Examiner — Mulugeta Mengesha
(74) Attorney, Agent, or Firm — Revolution IP, PLLC

(57) ABSTRACT

An advertisement analysis system for a sports broadcasting video using artificial intelligence, includes: a scene determination module estimating an area ratio occupied by a ground area in a broadcasted sports broadcasting video and calculating a height of an object detected in the sports broadcasting video to determine a scene of the sports broadcasting video; an advertisement judgment module generating an advertisement region according to the determined scene, classifying an advertisement image detected in the generated advertisement region according to an advertisement type of the advertisement region, and judging whether the classified advertisement image corresponds an official advertisement in real time; and an advertisement effect analysis module calculating, as an analysis result, an accumulated exposure period time, the number of accumulated exposure times, and an effect amount of money for the advertisement image judged to be the official advertisement from the advertisement judgment module.

12 Claims, 10 Drawing Sheets

(a)

(b)

(56) References Cited

U.S. PATENT DOCUMENTS

| | | | | |
|---|---|---|---|---|
| 2009/0060352 | A1* | 3/2009 | Distante | G06V 10/52 |
| | | | | 382/224 |
| 2011/0013836 | A1* | 1/2011 | Gefen | G06T 7/248 |
| | | | | 382/171 |
| 2016/0132941 | A1 | 5/2016 | Han et al. | |
| 2018/0082123 | A1* | 3/2018 | Katz | G06Q 30/0273 |
| 2022/0368964 | A1* | 11/2022 | Uzaki | H04N 21/4788 |

FOREIGN PATENT DOCUMENTS

| | | |
|---|---|---|
| KR | 10-2002-0022209 A | 3/2002 |
| KR | 10-2009-0115788 A | 11/2009 |
| KR | 10-2010-0126930 A | 12/2010 |
| KR | 10-2015-0087486 A | 7/2015 |
| KR | 10-2015-0088654 A | 8/2015 |
| KR | 10-2018-0098031 A | 9/2018 |
| KR | 10-2019-0097961 A | 8/2019 |

* cited by examiner

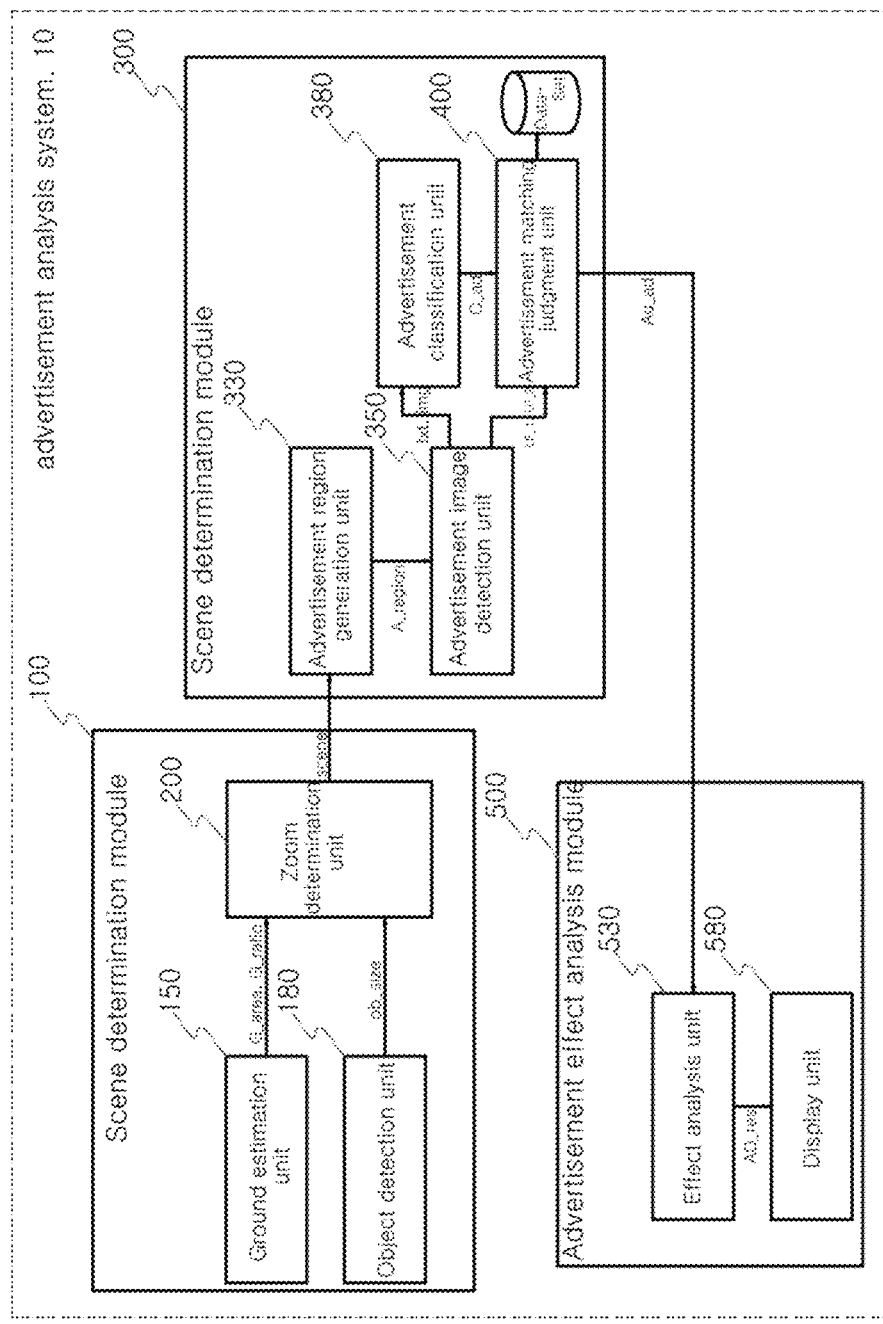
[FIG. 1]

[FIG. 2]
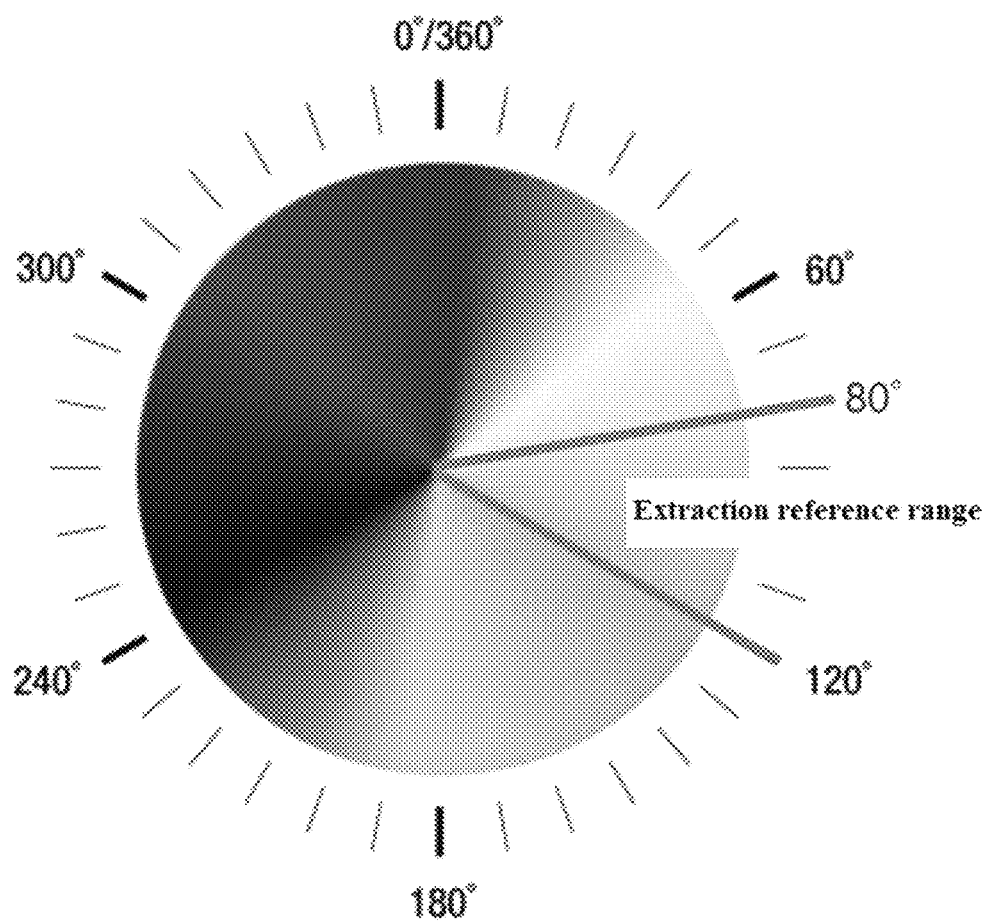

[FIG. 3]
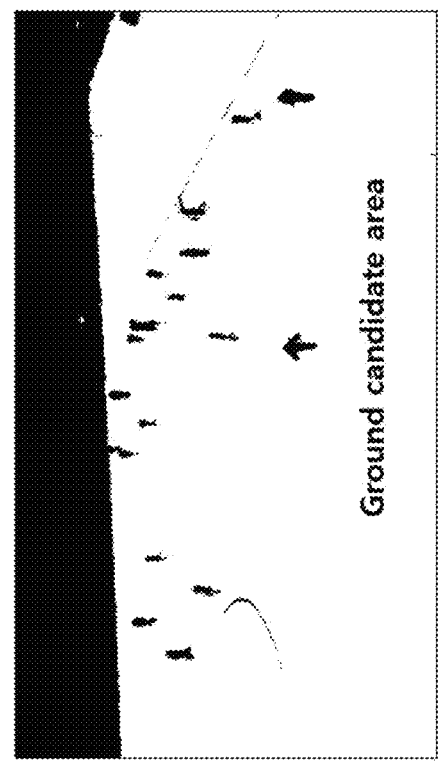
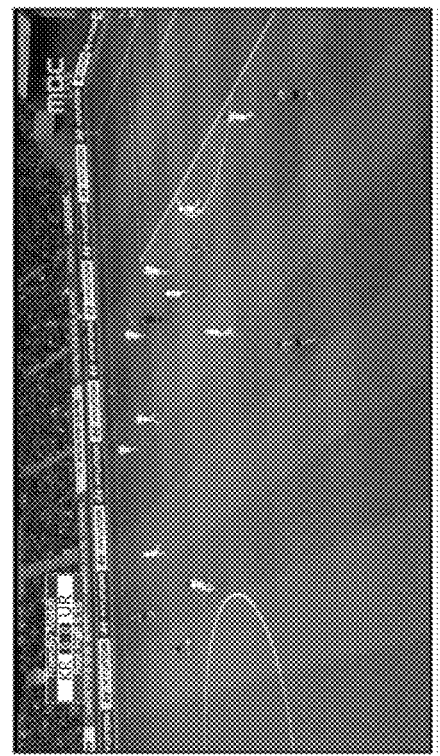
(a)
(b) Ground candidate area

[FIG. 4]
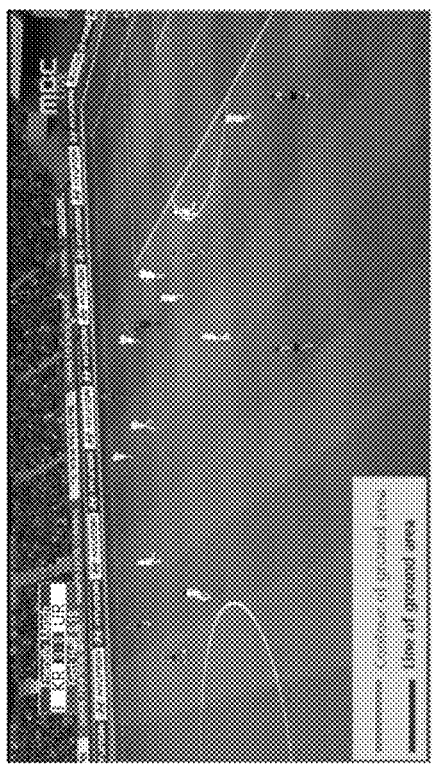
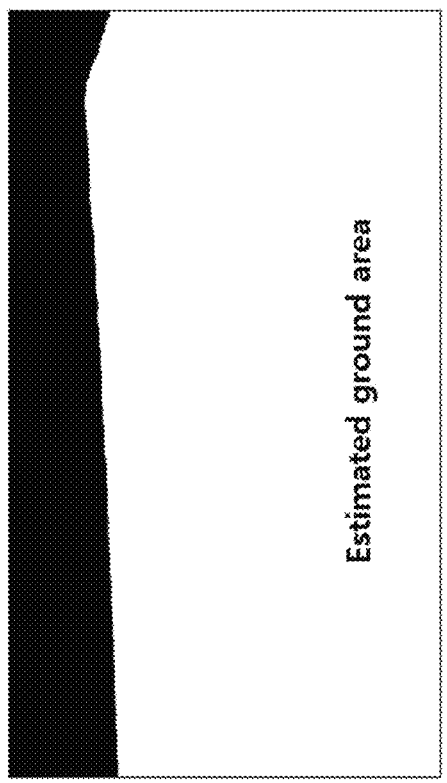
(a)
(b)

[FIG. 5]
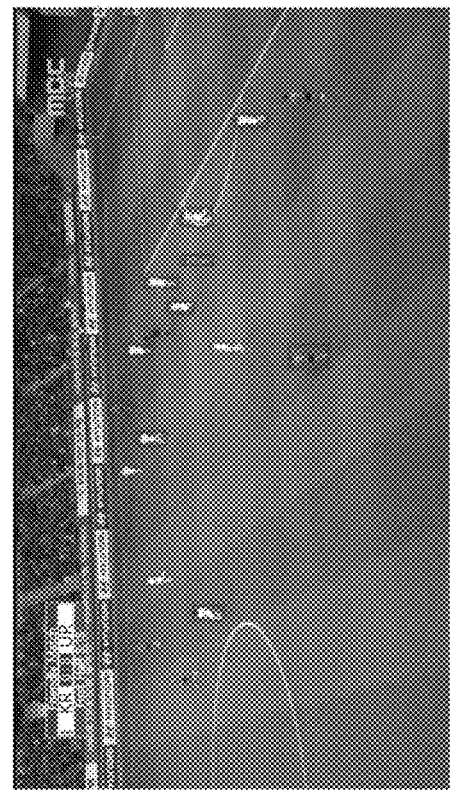
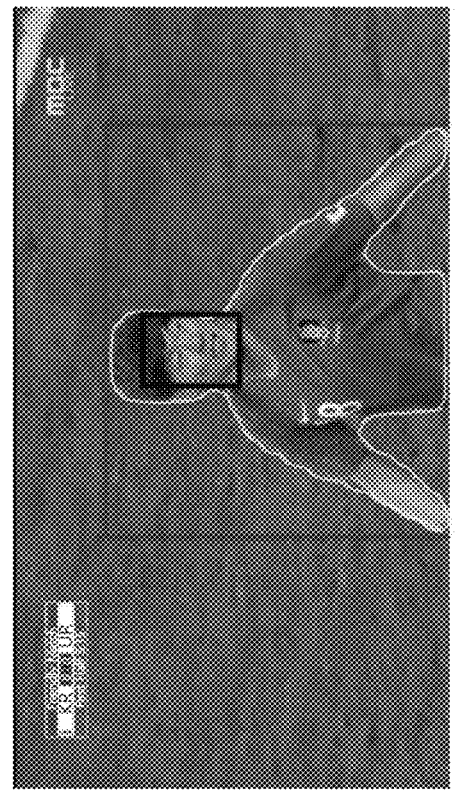

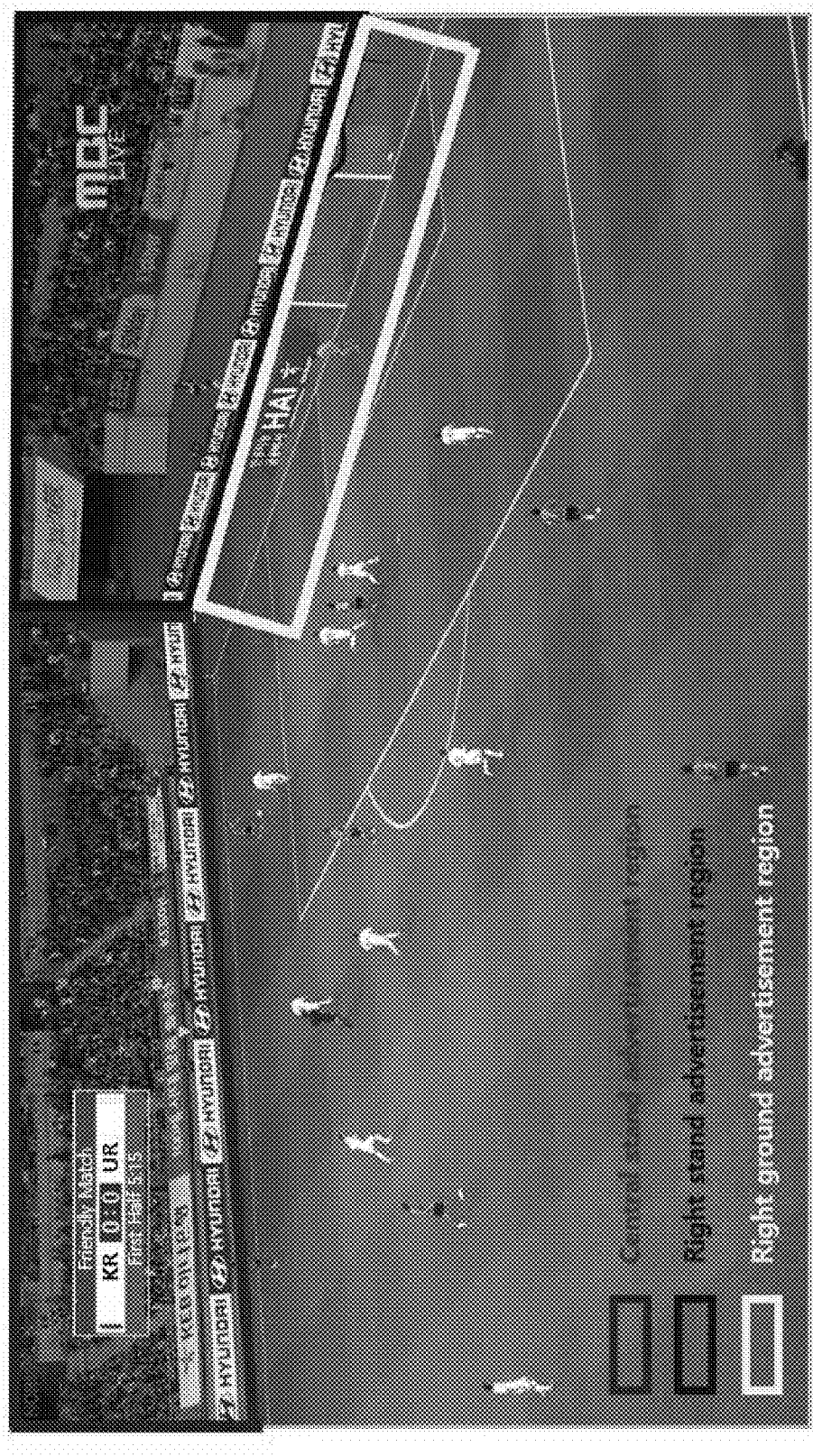
[FIG. 6]

[FIG. 7]

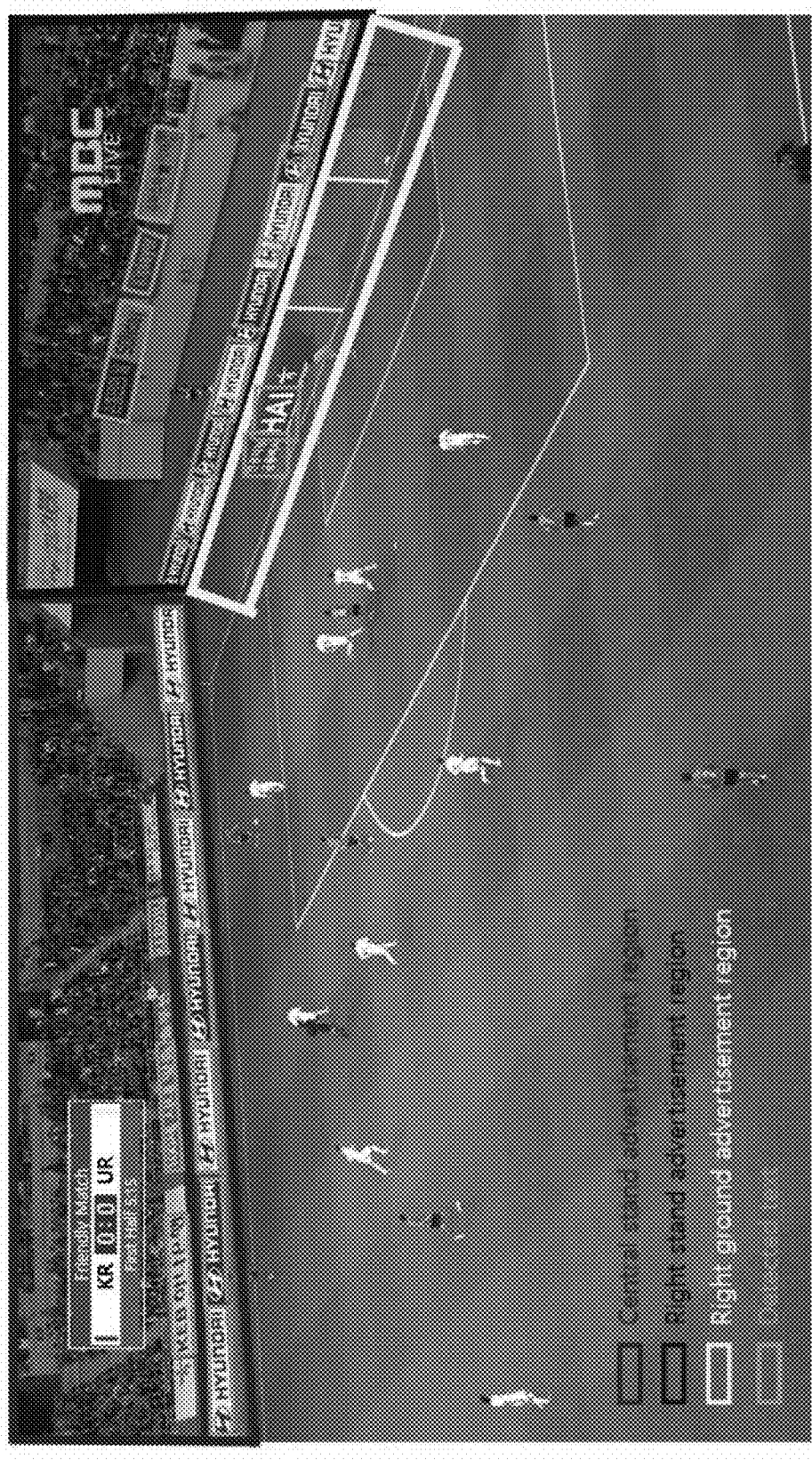
[FIG. 8]

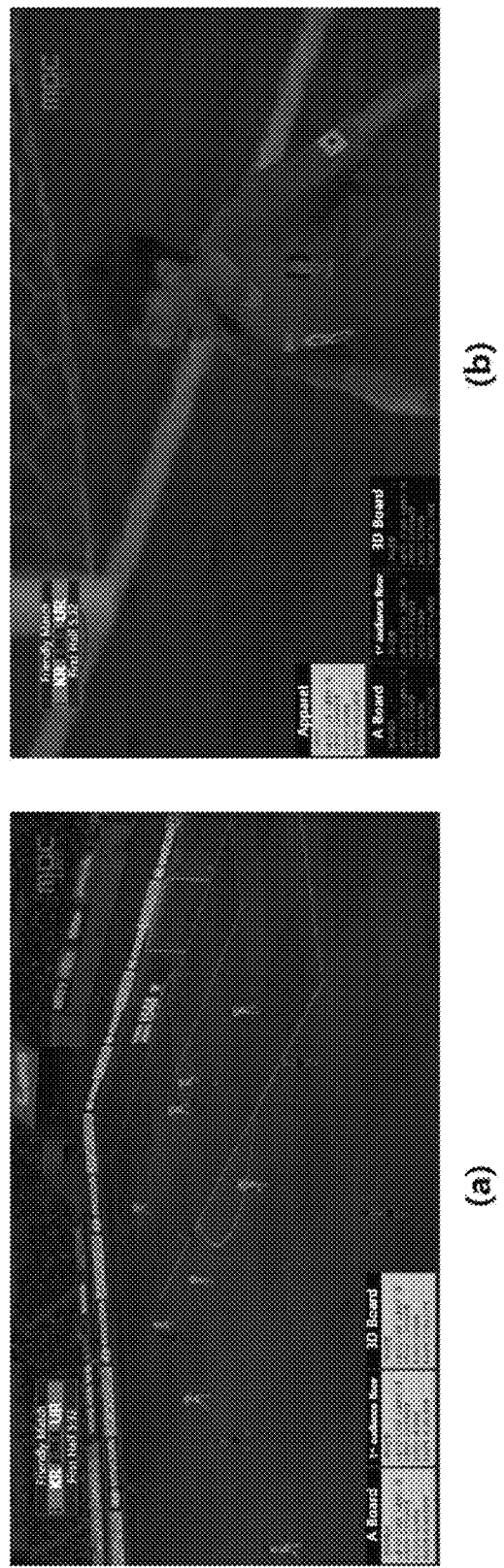
[FIG. 9]

[FIG. 10]
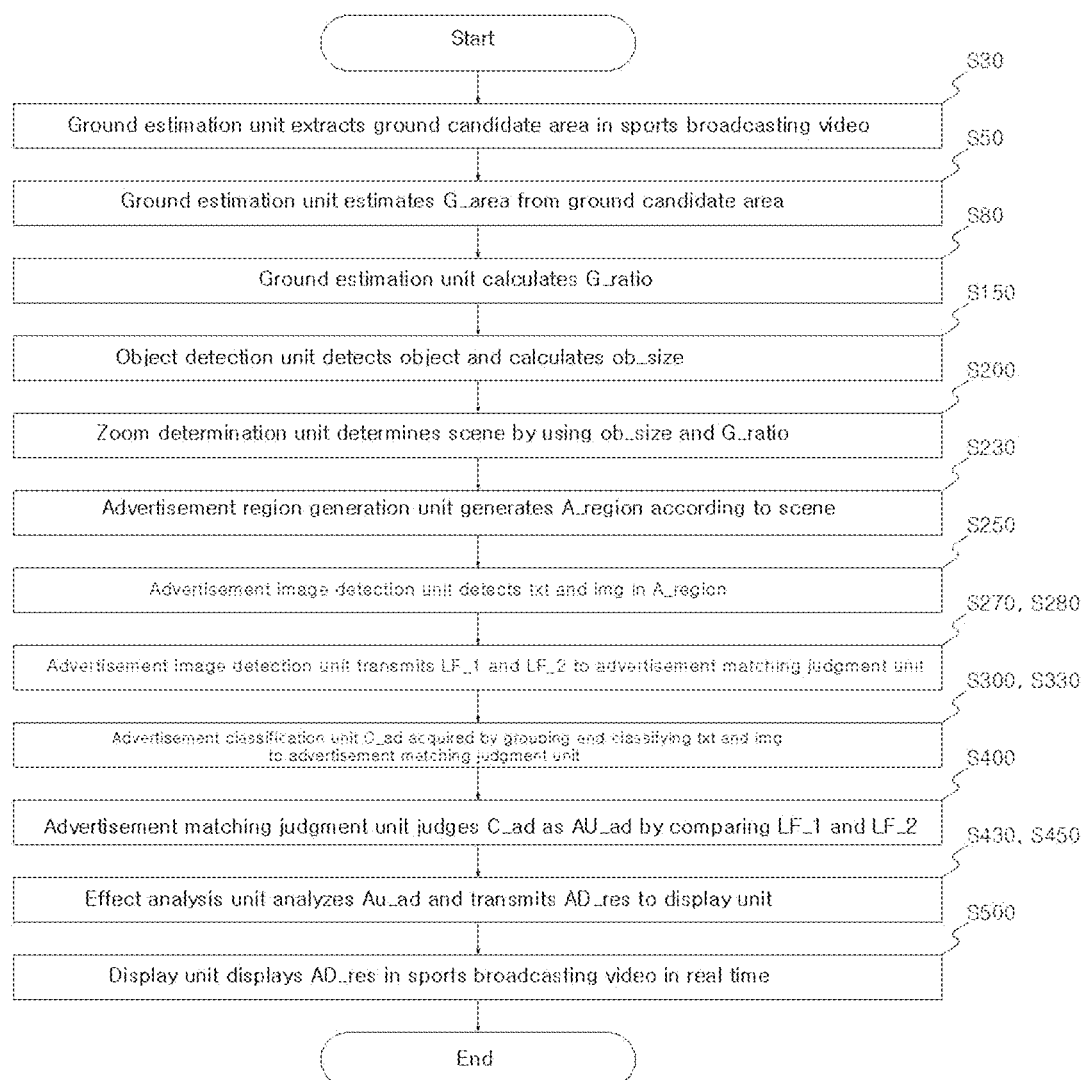

ADVERTISEMENT ANALYSIS SYSTEM AND METHOD FOR SPORTS BROADCASTING VIDEO USING ARTIFICIAL INTELLIGENCE

TECHNICAL FIELD

An embodiment according to a concept of the present invention relates to a real-time advertisement analysis technology in a sports game broadcasting video, and more particularly, to a technology that generates an advertisement region according to a viewpoint of a camera in a sports broadcasting video broadcasted by using artificial intelligence, detects an image appearing in the generated advertisement region, and displays an advertisement analysis result in a sports game broadcasting video only when the detected image corresponds to an official advertisement.

BACKGROUND ART

Sports games are said to be dramas without a script. Players pour out their efforts on the pitch, and fans can't take their eyes off the game until the end of the game with the tension of not knowing who will win. Fans watch the game with their hearts behind the running players, and those who support the same team or player form a consensus and rapidly unite and become closer. As such, sports have the power to move people's hearts. In addition, sports events are closely related to the development of media, and consumers watch sports events while watching sports events, such as advertisements displayed on A-boards, stands banners, 3D banners, etc. or corporate logos engraved on players' uniforms are unconsciously exposed to numerous advertisements. For a long time, companies have been using the positive effects of these sports and broadcasting sports events through the media for marketing. One of the biggest reasons companies participate in sports sponsorship is the exclusive marketing rights and board advertisements in the stadium exposed through TV broadcasts or news. Board advertising using stadium facilities has limitations in delivering fragmentary messages or simply exposing the brand itself, but it is relatively evaluated as a means for easily forming and enhancing a brand image of a sponsor corporate, so the board advertising is recognized as a new way capable of a traditional corporate advertisement today. However, due to the nature of the sports game, in which the viewpoint of the broadcasting camera dynamically changes according to the movement of the players, it was difficult to check the time or frequency at which these advertisements were captured, so it was not possible to accurately estimate the exposure effect of the advertisements. For this reason, techniques for analyzing the advertisement effect in the sports broadcasting video have been proposed, but the conventional techniques record a sports broadcasting video to analyze the advertisement effect in the sports broadcasting video, and extract video and images from the recorded data only after the broadcasting is finished.

Disclosure

Technical Problem

A technical object to be achieved by the present invention is to provide an advertisement analysis system for a sports broadcasting video using artificial intelligence, which automatically generates an advertisement region according to a viewpoint of a camera in a sports broadcasting video, detects an image appearing in the generated advertisement region in real time, and displays an advertisement analysis result in a sports broadcasting video in real time when the detected image corresponds to an official advertisement.

Another technical object to be achieved by the present invention is to provide an advertisement analysis method for a sports broadcasting video using artificial intelligence, which automatically generates an advertisement region according to a viewpoint of a camera in a sports broadcasting video, detects an image appearing in the generated advertisement region in real time, and displays an advertisement analysis result in a sports broadcasting video in real time when the detected image corresponds to an official advertisement.

Technical Solution

According to an exemplary embodiment of the present invention, an advertisement analysis system for a sports broadcasting video using artificial intelligence includes: a scene determination module estimating an area ratio occupied by a ground area in a broadcasted sports video and calculating a height of an object detected in the sports broadcasting video to determine a scene of the sports broadcasting video; an advertisement judgment module generating an advertisement region according to the determined scene, classifying an advertisement image detected in the generated advertisement region according to an advertisement type of the advertisement region, and judging whether the classified advertisement image corresponds an official advertisement in real time; and an advertisement effect analysis module calculating, as an analysis result, an accumulated exposure period time, the number of accumulated exposure times, and an effect amount of money for the advertisement image judged to be the official advertisement from the advertisement judgment module, and displaying the analysis result in the sports broadcasting video in real time. [6] In this case, the scene determination module may include a ground estimation unit estimating the ground area and an area ratio occupied by the ground area in the sports broadcasting video, an object detection unit detecting the object and calculating the height of the detected object in the sports broadcasting video, and a zoom determination unit determining the scene according to the area ratio occupied by the ground area estimated by the ground area estimation unit and the height of the object calculated by the object detection unit.

According to an embodiment, the ground estimation unit extracts a ground candidate area from the sports broadcasting video according to an extraction reference range of an HSV model, estimates a convex hull in which a contour of the extracted ground candidate area is approximated to a plurality of polygons as the ground area, and estimates a ratio of an area occupied by the estimated ground area in the area of the sports broadcasting video as the area ratio.

According to an embodiment, the object detection unit detects a bounding box for each of objects which exist in the sports broadcasting video, and a bounding box for a specific part of each of the objects and a mask contour of each of the objects by using an object recognition API, and calculates an average height of the bounding box of each of the detected objects as the height of the detected object.

According to an embodiment, the zoom determination unit determines the scene as a zoom-out scene when the height of the object calculated by the object detection unit is less than a minimum height reference value, determines the scene as a zoom-in scene when the height of the object calculated by the object detection unit is more than a maximum height reference value, and determines the scene as a zoom-normal scene when the height of the object calculated by the object detection unit has a value between the minimum height reference value and the maximum height reference value, and the area ratio estimated by the ground estimation unit is equal to or more than a predetermined area reference value.

Further, the advertisement judgment module may include an advertisement region generation unit generating the advertisement region in the sports broadcasting video according to the determined scene, an advertisement image detection unit detecting a figure and a text which exit in the generated advertisement region as the advertisement image, an advertisement classification unit classifying the detected advertisement image according to the advertisement type of the generated advertisement region, and an advertisement matching judgment unit comparing the classified advertisement image and an official advertisement stored in a data set and judging whether the classified advertisement image matches the official advertisement.

According to an embodiment, the advertisement region generation unit generates, as the advertisement region, at least any one of a central stand advertisement region, a left stand advertisement region, a left ground advertisement region, a right stand region, and a right ground advertisement region based on the ground area estimated by the scene determination module when the determined scene is a zoom-normal scene, and generates an area other than a face bounding box in the mask contour of the object detected by the scene determination module as the advertisement region when the determined scene is a zoom-in scene.

According to an embodiment, the advertisement image detection unit detects the figure by extracting a feature in the advertisement region by using a local feature detect method, and detects the text by using an individual text and a word text from the figure by using a region score and affinity score based text detection method.

According to an embodiment, the advertisement classification unit groups and classifies the detected advertisement image according to a distance from a boundary line of the estimated ground area when the determined scene is the zoom-normal scene, and classifies the detected advertisement image as an apparel advertisement when the determined scene is the zoom-in scene.

According to an embodiment, the advertisement matching judgment unit selects a proximate feature of a predetermined reference value or more by comparing a feature of the advertisement image classified by the advertisement classification unit and a feature of a reference image of the official advertisement stored in the data set by using a K-NN classification algorithm, performs predetermined scoring for the feature of the advertisement image, and the feature of the reference image and the proximate feature, and judges that the advertisement image classified by the advertisement classification unit matches the official advertisement when the scoring value is equal to or more than the predetermined reference value.

Further, the advertisement effect analysis module may include an effect analysis unit calculating, as the analysis result, an accumulated exposure period of time, the number of accumulated exposure times, and an effect amount of money of the advertisement image judged to be the official advertisement by the advertisement judgment module, and a display unit displaying the analysis result calculated by the effect analysis unit in the sports broadcasting video in real time.

According to an embodiment of the present invention, an advertisement analysis method for a sports broadcasting video using artificial intelligence includes: estimating, by a ground estimation unit, a ground area and an area ratio occupied by the ground area in a sports broadcasting video; detecting, by an object detection unit, one or more objects in the sports broadcasting video, and calculating an average height of bounding boxes for the detected objects as an object height; determining, by an advertisement region generation unit, whether the object detected by the object detection unit is capable of including an advertisement region, and generating the advertisement region in the sports broadcasting video according to whether the determined scene and the detected object are capable of including the advertisement region; detecting, by an advertisement image detection unit, an advertisement image which exists in the generated advertisement region, and providing a feature of the detected advertisement image and a feature of a reference image stored in a data set to an advertisement matching judgment unit; classifying, by an advertisement classification unit, the detected advertisement image according to an advertisement type of the generated advertisement region and transmitting the classified advertisement image to the advertisement matching judgment unit; judging, by the advertisement matching judgment unit, whether the classified advertisement image matches an official advertisement by comparing the feature of the provided advertisement image and the feature of the reference image; calculating, by an effect analysis unit, as the analysis result, an accumulated exposure period of time, the number of accumulated exposure times, and an effect amount of money of the advertisement image matching the official advertisement; and displaying, by a display unit, the analysis result analyzed by the effect analysis unit in the sports broadcasting video in real time.

Advantageous Effects

As described above according to an embodiment of the present invention, an advertisement analysis system and an advertisement analysis method for a sports broadcasting video using artificial intelligence have an effect of automatically generating an advertisement region according to a viewpoint of a camera in a sports broadcasting video, detecting an image appearing in the generated advertisement region in real time, and displaying an advertisement analysis result in a sports broadcasting video in real time when the detected image corresponds to an official advertisement to easily check an advertisement exposure effect in a stadium without recording a sports broadcasting video in real time.

DESCRIPTION OF DRAWINGS

FIG. 1 is a block diagram illustrating a configuration of an advertisement analysis system in a sports broadcasting video using artificial intelligence according to an embodiment of the present invention.

FIG. 2 is an exemplary diagram illustrating an extraction reference range of a color channel in an HSV color table.

FIG. 3 is an exemplary diagram illustrating that a ground estimation unit extracts a ground candidate area according to an HSV model.

FIG. 4 is an exemplary diagram illustrating that the ground estimation unit estimates a ground area.

FIG. 5 is an exemplary diagram illustrating that an object detection unit detects an object in a sports broadcasting video.

FIG. 6 is an exemplary diagram illustrating that an advertisement region generation unit generates the advertisement region in a zoom-normal scene.

FIG. 7 is an exemplary diagram illustrating that an advertisement image detection unit detects a figure in the advertisement region in a zoom-in scene.

FIG. 8 is an exemplary diagram illustrating that the advertisement image detection unit detects a text in the advertisement region in the zoom-normal scene.

FIG. 9 is an exemplary diagram illustrating that a display unit displays an analysis result calculated by an effect analysis unit in the sports broadcasting video in real time.

FIG. 10 is a flowchart for describing an advertisement analysis method for a sports broadcasting video using artificial intelligence according to an embodiment of the present invention.

MODES FOR THE INVENTION

Hereinafter, by describing a preferred embodiment of the present invention with reference to the accompanying drawings, the present invention will be described in detail.

FIG. 1 is a block diagram illustrating a configuration of an advertisement analysis system (hereinafter, referred to as 'advertisement analysis system') in a sports broadcasting video using artificial intelligence according to an embodiment of the present invention.

Referring to FIG. 1, an analysis system 10 according to an embodiment of the present invention includes a scene determination module 100, an advertisement judgment module 300, and an advertisement effect analysis module 500.

The analysis system 10 according to an embodiment of the present invention distinguishes a broadcasted sports broadcasting video according to a viewpoint of a camera, judges whether a text or image detected according to the distinguished viewpoint corresponds to an advertisement in real time, and classifies the text or image judged as the advertisement to be displayed in a predetermined advertisement region in the sports broadcasting video to analyze an advertisement effect.

Hereinafter, respective components 100, 300, and 500 of the analysis system 10 will be described in detail.

The scene determination module 100 may include a ground estimation unit 150, an object detection unit 180, and a zoom determination unit 200, and distinguish the broadcasted sports broadcasting video into a zoom-in scene, a zoom-normal scene, a zoom-out scene, etc., according to the viewpoint of the camera.

For example, the zoom-in scene may be viewed as a scene that captures a field player or a referee closer or a scene that captures a bench with a coaching staff and candidate players, and the zoom-normal scene may be viewed as a general broadcasting scene in which a play is in progress, and the zoom-out scene may be viewed as a scene that captures a ground in which the play is in progress from a very far distance.

That is, the scene determination module 100 may distinguish the sports broadcasting video into any one scene of the zoom-in scene, the zoom-normal scene, and the zoom-out scene by using a size of a person (e.g., the field player, the referee, the coaching staff) appearing in the sports broadcasting video and an area occupied by a ground area in the sports broadcasting video.

First, the ground estimation unit 150 estimates a ground area G_area and a ratio G_ratio occupied by the ground area in the sports broadcasting video.

A process in which the ground estimation unit 150 estimates the ground area G_area and the ratio G_ratio occupied by the ground area in the sports broadcasting video is described below.

First, the ground estimation unit 150 extracts a ground candidate area from the sports broadcasting video by using an HSV model.

The HSV model means a Hue-saturation-value model which is one of color models, and the ground estimation unit 150 extracts the ground candidate area by using, in particular, a Hue channel in the HSV model.

FIG. 2 is an exemplary diagram illustrating an extraction reference range of a color channel in an HSV color table.

Referring to FIG. 2, a ground of a general soccer field is a color included in a green category (approximately 60 to 180 degrees) in the color channel, and the ground estimation unit 150 may narrow and set an extraction reference range in the color channel to 80 to 120 degrees in order to more accurately extract the ground candidate area in the sports broadcasting video.

The ground estimation unit 150 extracts the ground candidate area from the sports broadcasting video according to the set extraction reference range.

In this specification, the soccer field is just described as an example for convenience of description, and the ground may be a ground in various games such as a basketball or a baseball.

Therefore, the extraction reference range may also be variously set according to the corresponding game, of course, and for example, in the case of the basketball, the extraction reference range may be set to 30 to 60 degrees.

FIG. 3 illustrates an example in which the ground estimation unit 150 extracts the ground candidate area according to the HSV model.

In this case, FIG. 3(*a*) illustrates an example of the sports broadcasting video, and FIG. 3(*b*) illustrates an example of extracting the ground candidate area by applying the extraction reference range to the sports broadcasting video.

Second, the ground estimation unit 150 finally estimates a ground area G_area through image postprocessing for the extracted ground candidate area.

That is, the ground estimation unit 150 approximates a contour of the extracted ground candidate area to a plurality of polygons, and then finally estimates a convex Hull of the approximated polygons to the ground area G_area.

FIG. 4 illustrates an example in which the ground estimation unit 150 estimates the ground area G_area.

In this case, FIG. 4(*a*) illustrates an example of finally estimating the ground area G_area in the sports broadcasting video through the image postprocessing, and FIG. 4(*b*) illustrates an example of displaying the estimated ground area G_area with a line with respect to the sports broadcasting video.

As a result, the ground estimation unit 150 may estimate a line linked in a horizontal direction as a touch line, and estimate a line linked in a vertical direction as a goal line to estimate the ground area.

Third, the ground estimation unit 150 calculates a ratio G_ratio for a total area of the video from an area for the estimated ground area G_area.

Meanwhile, the object detection unit 180 detects a person such as a field player, a coaching staff, a referee, etc., as the object in the sports broadcasting video, and measures a height ob_size of the detected object.

The object detection unit 180 may use a known open source API such as a TensorFlow Object Detection API as an API for object recognition (classification), and use a Mask- RCNN model capable of utilizing object segmentation information such as Mask Contour in addition to a bounding box for the object and a specific part for the object.

FIG. 5 is a diagram illustrating an example in which the object detection unit 180 detects the object in the sports broadcasting video.

In this case, FIG. 5(a) illustrates an example of detecting the object and representing the detected object as the bounding box and FIG. 5(b) illustrates an example illustrating the bounding box for the object, and a bounding box for a face of the object and a mask contour of the object.

That is, a red-line box FIGS. 5(a) and 5(b) may indicate a bounding box of a detected person, and a black-line box in FIG. 5(b) may indicate the bounding box for the face of the person and a yellow line may mean the mask contour (i.e., a contour line) of the person, and the object detection unit 180 may detect the mask contour in addition to the bounding box of the corresponding object.

Thereafter, the object detection unit 180 calculates an average height ob_size of the bounding boxes based on bonding boxes of respective detected objects.

According to an embodiment, the object detection unit 180 does not calculate an average height of bounding boxes for all objects by detecting all objects in the sports broadcasting video, but calculates an average height for targets by detecting only targets having a very high probability in which the object will be the person, and as a result, a total calculation time may also be shortened.

Meanwhile, the zoom determination unit 200 determines a scene of the sports broadcasting video as any one of the zoom-in scene, the zoom-normal scene, and the zoom-out scene according to the area ratio G_ratio of the ground area estimated by the ground area estimation unit 150 and the average height ob_size of the object calculated by the object detection unit 180.

For example, the zoom determination unit 200 determines the scene as the zoom-out scene when the average height ob_size of the bounding box calculated by the object detection unit 180 is equal to or less than a predetermined minimum height reference value (e.g., 15 pixels), and determines the scene as the zoom-in scene when the average height is equal to or more than a predetermined maximum height reference value (e.g., 125 pixels).

Further, the zoom determination unit 200 determines the scene as the zoom-normal scene when the calculated average height ob_size of the bounding box is between the minimum height reference value and the maximum height reference value (e.g., 15 pixels to 125 pixels), and a weight G_ratio which the estimated ground area occupies in an entire video is equal to or more than a predetermined area reference value (e.g., 20%).

In this case, when the weight G_ratio of the estimated ground area does not satisfy 20%, the scene may be classified as other scenes.

According to an embodiment, when the zoom determination unit 200 determines the sports broadcasting video as the zoom-normal scene, it is estimated whether there is a goal line formed in a vertical direction centering on a touch line formed in a horizontal direction in the estimated ground area G_area and if there is the goal line, the scene may be estimated as any one of a central view, a left goal post view, and a right goal post view according to whether the goal line exists at a left side or a right side of the touch line.

Referring back to FIG. 1, the advertisement judgment module 300 includes an advertisement region generation unit 330, an advertisement image detection unit 350, an advertisement classification unit 380, and an advertisement matching judgment unit 400, and generates an advertisement region A_region according to the scene (e.g., any one of the zoom-in scene, the zoom-normal scene, and the zoom-out scene) of the sports broadcasting video determined by the zoom determination unit 200, detects a text or an image around the advertisement region A_region and classifies the detected text or image according to an advertisement location, and judges whether the detected text or image is an advertisement suitable for the classified advertisement location.

First, the advertisement region generation unit 330 generates a plurality of advertisement regions A_region in which the advertisement is to be posted according to the ground area G_area estimated by the ground estimation unit 150 when the scene of the sports broadcasting video determined by the zoom determination unit 200 is the zoom-normal scene.

For example, when the scene of the sports broadcasting video determined by the zoom determination unit 200 is the zoom-normal scene, the advertisement region generation unit 300 generates a corresponding advertisement region A_region among a central stand advertisement region, a left stand advertisement region, a left ground advertisement region, a right stand advertisement region, and a right ground advertisement region based on the line (touch line or goal line) of the ground area G_area estimated by the ground estimation unit 150.

FIG. 6 illustrates an example in which the advertisement region generation unit illustrated in FIG. 1 generates the advertisement region in the zoom-normal scene.

Referring to FIGS. 1 to 6, the advertisement region generation unit 300 generates a central stand advertisement region (e.g., a red box), a right stand advertisement region (e.g., a blue box), and a right ground advertisement region (e.g., a yellow box) adjacent to a right stand around the ground area G_area estimated by the ground estimation unit 150.

Meanwhile, the advertisement region generation unit 330 generates the advertisement region A_region in which the advertisement is to be posted according to the object detected by the object detection unit 180 when the scene of the sports broadcasting video determined by the zoom determination unit 200 is the zoom-in scene.

That is, the advertisement region generation unit 330 generates a region other than the face bounding box part in the mask contour of the object detected by the object detection unit 180 as the advertisement region A_region when the scene of the sports broadcasting video determined by the zoom determination unit 200 is the zoom-in scene.

For example, a region (i.e., a uniform of the field player) other than the face bounding box part from the mask contour of the object detected in FIG. 4(b) may be generated as the advertisement region A_region.

According to an embodiment, the advertisement region generation unit 300 may also determine whether the detected object is a target which may include the advertisement region A_region before generating the advertisement region A_region in advance.

For example, the object detected by the object detection unit 180 may be various objects including the field player, a goalkeeper, the coaching staff, a candidate player, a referee group, general spectators, etc., and the advertisement region generation unit 300 may determine only the field player, the goalkeeper, the coaching staff, and the candidate player among the objects as a target to generate the advertisement region A_region.

To this end, the advertisement region generation unit 300 may use the HSV model, and extracts a Hue value of the region other than the face bounding box in the mask contour of the detected object and compares the extracted Hue value with a Hue value of a predetermined advertisement target object.

For example, when the advertisement target object Hue value is set as in Table 1 below,

TABLE 1

| Advertisement target object | Hue range |
|---|---|
| Team A field player | 340 degrees to 30 degrees |
| Team A goalkeeper | 40 degrees to 80 degrees |
| Team A coaching staff | 260 degrees to 300 degrees |
| Team A candidate player | 260 degrees to 300 degrees |
| Referee group | 230 degrees to 250 degrees |
| Team B field player | 170 degrees to 190 degrees |

The advertisement region generation unit 300 extracts the Hue value of the region other than the face bounding box part in the mask region of the detected object as in FIG. 4(b), and when the extracted Hue value is between 340 degrees and 30 degrees, the advertisement region generation unit 300 judges the detected object as the A team field player and determines the detected object as the target to generate the advertisement region A_region. According to another embodiment, the advertisement region generation unit 300 may additionally generate a plurality of advertisement regions A_region in to which the advertisement is to be posted according to the ground area G_area estimated by the ground estimation unit 150 in addition to the object detected by the object detection unit 180.

For example, the scene of the sports broadcasting video determined by the zoom determination unit 200 is the zoom-in scene, but when the contour line of the ground area G_area is captured in addition to the field player, the advertisement region (e.g., the corresponding region in the central stand advertisement region or the right ground advertisement region) described in the zoom-normal scene may be additionally generated.

The advertisement image detection unit 350 detects an advertisement image, e.g., a figure (img) or a text (txt) such as a corporate logo (CI), a brand logo (BI), a trade name, or a trademark from the advertisement region A_region generated by the advertisement region generation unit 330.

First, the advertisement image detection unit 350 may detect an advertisement image by extracting a feature LF_1 in the advertisement region A_region by using a known local feature detect method such as SIFT, SURF, BRISK, or FREAK in order to detect the advertisement image in the advertisement region A_region.

FIG. 7 illustrates an example in which the image detection unit 350 detects a figure (img) in the advertisement region A_region in the zoom-in scene.

Referring to FIG. 7, the advertisement region A_region in the zoom-in scene is a region (e.g., a purple line) other than the face bounding box part in the mask contour of the object, and the advertisement image detection unit 350 detects a light blue box part in the advertisement region A_region as the figure (img).

Further, the advertisement image detection unit 350 may use a neural network based text detection model using a region score and an affinity score in order to check whether the advertisement image detected in the advertisement region A_region is the text (txt).

In general, in the text detection model, the region score may mean a probability that the corresponding pixel will be a center of a character, the affinity score may mean a probability that the corresponding pixel will be a center of two adjacent texts, and it may be determined whether individual texts may be grouped into one word through one score.

That is, the advertisement image detection unit 350 judges a probability that the individual pixel of the advertisement image detected in the generated advertisement region A_region will be the text to detect the individual text and detects a word-unit text by reviewing a mutual connectivity between the detected individual texts.

Thereafter, when mutual adjacent edges of word-unit texts exist in a predetermined distance range in the horizontal direction, and a predetermined intersection over union (IoU) is satisfied in the vertical direction, the advertisement image detection unit 350 merges the word-unit texts and detects the merged texts as a final text (txt).

FIG. 8 illustrates an example in which the advertisement image detection unit 350 detects the text (txt) in the advertisement region A_region in the zoom-normal scene.

Referring to FIG. 8, the advertisement image detection unit 350 detects the text (txt) in the A board of the central stand advertisement region (red box region) and a first-floor stand floor in the advertisement region A_region generated above, detects the text (txt) in the A board of the right stand advertisement region (blue box region) and a second-floor stand floor, and detects the text (txt) in a 3D board of the right ground advertisement region (yellow box region).

According to an embodiment, the advertisement image detection unit 350 may provide the extracted feature LF_1 to the advertisement matching judgment unit 400, and may extract a feature LF_2 for an original image of an advertisement to be posted in an actual stadium and provide the extracted feature to the advertisement matching judgment unit 400.

Contents in which the advertisement image detection unit 350 provides the features LF_1 and LF_2 to the advertisement matching judgment unit 400 will be described below in detail again in describing the advertisement matching judgment unit 400.

Meanwhile, the advertisement classification unit 380 calculates and groups a distance up to each text (txt) or figure (img) from a contour line (e.g., the touch line or goal line) of the ground estimated by the ground estimation unit 150 as above to classify the advertisement image such as each text (txt) or figure (img) according to a advertisement type.

For example, a group closest to the touch line is classified as an A-board advertisement among the advertisement types, and classified as a first-floor stand floor advertisement and a second-floor stand floor advertisement in sequence.

Further, a group closest to the goal line is classified as a 3D board advertisement among the advertisement types, and classified into the A-board advertisement, the first-floor stand floor advertisement, and the second-floor stand floor advertisement in sequence.

Furthermore, when the detected text (txt) or figure (img) is detected in the region other than the face bounding box part in the mask contour of the object, the advertisement classification unit 380 classifies the group as an apparel advertisement.

Thereafter, the advertisement classification unit 380 transmits an advertisement C_ad classified for each group to the advertisement matching judgment unit 400.

Meanwhile, the advertisement matching judgment unit 400 judges whether the advertisement C_ad classified by the advertisement classification unit 380 matches an advertisement officially ordered in the corresponding stadium.

In general, sponsors that are to post the advertisement in the sports game is determined in advance, and advertisements to be posted by the sponsors are also predetermined.

The advertisement matching judgment unit 400 classifies advertisement information for the officially ordered advertisement according to a predetermined advertisement type and stores the advertisement information in a data set.

The advertisement information may include a name of an advertisement to be posted, an advertisement unit price, an original image of the advertisement, and a local feature extracted from a variation image (e.g., stretching, tilting, blurring, etc.) for the original image.

In this specification, the original image of the advertisement and the variation image for the original image are defined as an reference image.

Further, the predetermined advertisement type may mean a location at which the advertisement is to be posted as described above, and may be, for example, the A board, the first-floor stand floor, the second-floor stand floor, the 3D board, etc.

Meanwhile, according to an embodiment, an advertisement to be posted to a specific type (e.g., the A board) among the advertisement types may be a single advertisement of only a specific sponsor, and an advertisement to be posted to another type (e.g., the 3D board) may also be advertisements of a plurality of sponsors.

That is, the advertisement matching judgment unit 400 may store a feature for a reference image of a specific sponsor in the data set for the A board, and store a feature point for the reference image for each of various sponsors in the data set for the 3D board.

Thereafter, the advertisement matching judgment unit 400 compares the feature LF_1 of the advertisement (e.g., the advertisement detected and classified in the actual sports broadcasting video) classified by the advertisement classification unit 380 and the feature LF_2 for the advertisement type of the data set to judge whether the advertisement C_ad classified by the advertisement classification unit 380 corresponds to the officially ordered advertisement.

For example, when the advertisement C_ad classified by the advertisement classification unit 380 is the A board advertisement, the advertisement matching judgment unit 400 compares the feature of the text or figure of the classified advertisement C_ad and advertisement information (i.e., features of the reference images) stored in the corresponding advertisement type (i.e., the A board) of the data set to judge whether the advertisement C_ad classified by the advertisement classification unit 380 corresponds to the officially ordered advertisement.

In this case, the features LF_1 of the text (txt) or figure (img) of the advertisement C_ad classified by the advertisement classification unit 380 and the features LF_2 for the corresponding advertisement type of the data set may be extracted from the advertisement image detection unit 350 as described above.

In addition, a method in which the advertisement matching judgment unit 400 judges whether the advertisement C_ad classified by the advertisement classification unit 300 corresponds to the officially ordered advertisement by comparing the features LF_1 and LF_2 is described below.

First, the advertisement matching judgment unit 400 compares a first feature LF_1 for the text (txt) or figure (img) of the classified advertisement C_ad and the second feature LF_2 for the corresponding reference image to select features having a similarity of a predetermined reference value or more as a third feature LF_3.

In this case, the advertisement matching judgment unit 400 searches proximate features for the first feature LF_1 and the second feature LF_2 by using a known classification algorithm such as k-Nearest Neighbor (k-NN), and when the searched proximate feature shows a similarity of a predetermined reference value, the advertisement matching judgment unit 400 selects the proximate feature as the third feature LF_3.

Thereafter, the advertisement matching judgment unit 400 performs scoring for advertisement matching judgment as in Equation 1 below.

$$\text{Score} = \frac{\text{Number of LF\_3}}{\text{Number of LF\_1} + \text{Number of LF\_2} - \text{Number of LF\_3}} \quad [\text{Equation 1}]$$

That is, the advertisement matching judgment unit 400 calculates the score as a value acquired by dividing the number of third features LF_3 by a value acquired by subtracting the number of third features LF_3 from a sum of the number of first features LF_1 and the number of second features LF_2.

In addition, when the score calculated as in the equation satisfies a predetermined reference value or more, the advertisement matching judgment unit 400 judges the advertisement C_ad classified by the advertisement classification unit 300 as an appropriate advertisement Au_ad corresponding to the officially ordered advertisement.

In this case, the score may have a range of 1.0 to 0.0, and the predetermined reference value may be set to 0.5.

Referring back to FIG. 1, the advertisement effect analysis module 500 includes an effect analysis unit 530 and a display unit 580, and analyzes advertisement Au_ad judged to correspond to the officially ordered advertisement by the advertisement judgment unit 400, and displays an analyzed result in the sports broadcasting video in real time.

First, the effect analysis unit 530 accumulates and calculates an exposure period of time and the number of exposure times of the officially ordered advertisement stored in the data set corresponding to the advertisements Au_ad judged to correspond to the officially ordered advertisement by the advertisement matching judgment unit 400, and estimates an effect amount of money for the corresponding advertisement.

In this case, the effect amount of money for the corresponding advertisement may be estimated as an amount of money in which the exposure period of time is reflected on the unit price of the corresponding advertisement.

Consequently, the effect analysis unit 530 may calculate an analysis result AD_res for the name, the advertisement type (e.g., the location), the exposure period of time, the number of exposure times, and the effect amount of money of the corresponding advertisement during real-time broadcasting of the sports game.

The display unit 580 may display the analysis result AD_res calculated by the effect analysis unit 530, i.e., the name, the advertisement type (e.g., the location), the exposure period of time, the number of exposure times, and the effect amount of money of the corresponding advertisement in the sports broadcasting video in real time.

FIG. 9 illustrates an example in which the display unit 580 displays the analysis result AD_res of the corresponding advertisement analyzed by the effect analysis unit 530 in the sports broadcasting video in real time.

In this case, FIG. 9(a) illustrates an example of displaying the analysis result of the A board advertisement, the first-floor stand floor advertisement, and the 3D board advertisement detected at a first time point (e.g., 5 minutes and 21 seconds in the first half) in a yellow box and FIG. 9(b) illustrates an example of displaying the analysis result for the apparel advertisement detected at a second time point (e.g., 5 minutes and 33 seconds in the first half) after the first time point in the yellow box.

As described above, the advertisement analysis system 10 according to an embodiment of the present invention has an effect of distinguishing a broadcasted sports broadcasting video according to the viewpoint, judging whether a text or image detected according to the distinguished viewpoint corresponds to an official advertisement in real time, and when judging that the text or image corresponds to the official advertisement, displaying the analysis result for the judgment in the sports broadcasting video in real time.

FIG. 10 is a flowchart for describing an advertisement analysis method (hereinafter, referred to as 'advertisement analysis method') in a sports broadcasting video using artificial intelligence according to an embodiment of the present invention.

Referring to FIGS. 1 to 10, the ground estimation unit 150 extracts a ground candidate area in the sports broadcasting video according to an extraction reference range of an HSV model (S30).

Sequentially, the ground estimation unit 150 estimates a ground area G_area through image postprocessing (using a block hull of a polygon after approximating a ground contour to a small number of polygons) for a contour of the extracted ground candidate area (S50).

In this case, the ground estimation unit 150 may estimate a line linked in a horizontal direction as a touch line, and estimate a line linked in a vertical direction as a goal line in the estimated ground area G_area to divide the ground area into a central view, a left goal post view, and a right goal post view.

Thereafter, the ground estimation unit 150 calculates a ratio G_ratio for a total area of the sports broadcasting video from an area for the estimated ground area G_area.

The object detection unit 180 detects one or more objects (a field player, a coaching staff, a referee, etc.) in the sports broadcasting video (S130), and calculates an average height ob_size of the detected object (S150).

In this case, the object detection unit 180 may detect a contour line of the object such as a mask contour in addition to bounding boxes for the object and a specific portion (e.g., a face) of the object (S130).

The object detection unit 180 may calculate the average height ob_size of bounding boxes for all objects by detecting all objects in the sports broadcasting video, but calculates an average height ob_size for targets by detecting only targets having a very high probability in which the object will be the person, and as a result, a total calculation time may also be shortened.

The zoom determination unit 200 determines a scene of the sports broadcasting video as any one of the zoom-in scene, the zoom-normal scene, and the zoom-out scene according to the area ratio G_ratio of the ground area estimated by the ground area estimation unit 150 and the average height ob_size of the bounding box of the object calculated by the object detection unit 180 (S200).

For example, the zoom determination unit 200 determines the scene as the zoom-out scene when the average height ob_size of the bounding box calculated by the object detection unit 180 is equal to or less than a predetermined minimum reference value, and determines the scene as the zoom-in scene when the average height is equal to or more than a predetermined maximum reference value.

Further, the calculated average height ob_size of the bounding box is between the predetermined minimum reference value and the predetermined maximum reference value, and when a weight G_ratio which the estimated ground area G_area occupies in an entire video is equal to or more than a predetermined ratio, the scene is determined as the zoom-normal scene.

The advertisement region generation unit 330 generates the advertisement region A_region according to the scene of the sports broadcasting video determined from the zoom determination unit 200 (S230).

When the determined scene is the zoom-normal scene, the advertisement region generation unit 330 generates an advertisement region to which the advertisement is to be posted in the ground region (e.g., the central view, the left goal post view, and the right goal post view) estimated by the ground estimation unit 150.

For example, the advertisement region generation unit 300 generates a corresponding advertisement region A_region among a central stand advertisement region, a left stand advertisement region, a left ground advertisement region, a right stand advertisement region, and a right ground advertisement region based on the ground area G_area estimated by the ground estimation unit 150.

When the determined scene is the zoom-in scene, the advertisement region generation unit 330 generates a region other than the face bounding box part in the mask contour of the object detected by the object detection unit 180 as the advertisement region A_region.

In this case, the advertisement region generation unit 300 may determine whether the object detected by the object detection unit 180 is a target which may include the advertisement region A_region in advance by using the HSV model (S210).

According to another embodiment, even though the determined scene is the zoom-in scene, the advertisement region generation unit 300 may additionally generate a plurality of advertisement regions A_region in to which the advertisement is to be posted by reflecting the ground area G_area estimated by the ground estimation unit 150 in addition to the object detected by the object detection unit 180.

For example, the scene of the sports broadcasting video determined by the zoom determination unit 200 is the zoom-in scene, but when the contour line (the touch line or the goal line) of the ground area G_area is captured in addition to the field player, the advertisement region described in the zoom-normal scene may be additionally generated.

The advertisement image detection unit 350 detects an advertisement image, e.g., an image (img) or a text (txt) from the advertisement region A_region generated by the advertisement region generation unit 330.

First, the advertisement image detection unit 350 may detect an advertisement image by extracting a feature point LF_1 in the advertisement region A_region by using a known local feature detect method in order to detect the advertisement image in the advertisement region A_region.

Further, the advertisement image detection unit 350 may detect an individual text and a word text by utilizing a neural network based text detection model using a region score and an affinity score for the advertisement image detected in the advertisement region A_region, and detect a final text (txt)

according to a distance between adjacent edges of the detected word-unit texts and whether predetermined IoU is satisfied.

Sequentially, the advertisement image detection unit 350 provides a feature LF_1 extracted in the advertisement region A_region to the advertisement matching judgment unit 400 (S270), and extracts a feature LF_2 for a reference image of official advertisements stored in a data set of the advertisement matching judgment unit 400 and provides the extracted feature to the advertisement matching judgment unit 400 (S280).

Meanwhile, the advertisement classification unit 380 groups and classifies the figure (img) or In this case, the advertisement classification unit 380 calculates a distance up to the detected figure or text from the boundary line of the grounded area G_area estimated by the ground estimation unit 150, and groups and classifies the figure or text or when the detected text or figure is detected in the area other than the face bounding box part in the mask contour, classifies the detected text or figure as the apparel advertisement (S300).

Sequentially, the advertisement classification unit 380 transmits an advertisement C_ad classified for each group to the advertisement consistency judgment unit 400 (S380).

The advertisement matching judgment unit 400 compares the feature LF_1 of the advertisement (e.g., the advertisement detected and classified in the actual sports broadcasting video) classified by the advertisement classification unit 380 and the feature LF_2 for the advertisement location of the data set to judge whether the advertisement classified by the advertisement classification unit 380 corresponds to the officially ordered advertisement.

To this end, the advertisement matching judgment unit 400 searches proximate features for the first feature LF_1 for the text or figure of the advertisement classified by using a k-NN algorithm, and the second feature LF_2 for the corresponding reference image, and when the searched proximate feature shows a similarity of a predetermined reference value, the advertisement matching judgment unit 400 selects the proximate feature as the third feature LF_3 (S330).

Sequentially, the advertisement matching judgment unit 400 performs scoring advertisement matching judgment as in Equation 1 above, and when the calculated score satisfies a predetermined reference value or more, judges the corresponding advertisement as the officially ordered advertisement (S400).

Meanwhile, the effect analysis unit 530 accumulates and calculates an exposure period of time, the number of exposure times, and an effect amount of money of the official advertisement in the data set corresponding to the advertisements Au_ad judged to correspond to the advertisements Au_ad judged to correspond to the official advertisement by the advertisement matching judgment unit 400.

In this case, the effect amount of money for the corresponding advertisement may be estimated as an amount of money in which the exposure period of time is reflected on the unit price of the corresponding advertisement.

Sequentially, the effect analysis unit 530 transmits an analysis result AD_res for the name, the advertisement type, the exposure period of time, the number of exposure times, and the effect amount of money of the official advertisement to a display unit (S450).

The display unit 580 may display the analysis result AD_res transmitted by the effect analysis unit 530, i.e., the name, the advertisement type (e.g., the location), the exposure period of time, the number of exposure times, and the effect amount of money of the corresponding advertisement in the sports broadcasting video in real time (S500).

The above description just illustrates the technical spirit of the present invention and various changes and modifications can be made by those skilled in the art to which the present invention pertains without departing from an essential characteristic of the present invention.

Accordingly, the embodiments disclosed herein are intended to not limit but describe the technical spirit of the present invention but the scope of the technical spirit of the present invention is not limited by the embodiments. The protective scope of the present disclosure should be construed based on the following claims, and all the technical concepts in the equivalent scope thereof should be construed as falling within the scope of the present disclosure.

INDUSTRIAL APPLICABILITY

The present invention relates to an advertisement analysis system and an advertisement analysis method for a sports broadcasting video using artificial intelligence, which automatically generate an advertisement region according to a viewpoint of a camera in a sports broadcasting video, detect an image appearing in the generated advertisement region in real time, and display an advertisement analysis result in a sports broadcasting video in real time when the detected image corresponds to an official advertisement, and has an industrial applicability.

The invention claimed is:

1. An advertisement analysis system for a sports broadcasting video using artificial intelligence, the system comprising:
    a scene determination module estimating an area ratio occupied by a ground area in a broadcasted sports broadcasting video and calculating a height of an object detected in the sports broadcasting video to determine a scene of the sports broadcasting video;
    an advertisement judgment module generating an advertisement region according to the determined scene, classifying an advertisement image detected in the generated advertisement region according to an advertisement type of the advertisement region, and judging whether the classified advertisement image corresponds an official advertisement in real time; and
    an advertisement effect analysis module calculating, as an analysis result, an accumulated exposure period time, the number of accumulated exposure times, and an effect amount of money for the advertisement image judged to be the official advertisement from the advertisement judgment module, and displaying the analysis result in the sports broadcasting video in real time.

2. The advertisement analysis system for a sports broadcasting video using artificial intelligence of claim 1, wherein the scene determination module includes
    a ground estimation unit estimating the ground area and an area ratio occupied by the ground area in the sports broadcasting video,
    an object detection unit detecting the object and calculating the height of the detected object in the sports broadcasting video, and
    a zoom determination unit determining the scene according to the area ratio occupied by the ground area estimated by the ground area estimation unit and the height of the object calculated by the object detection unit.

3. The advertisement analysis system for a sports broadcasting video using artificial intelligence of claim 2, wherein the ground estimation unit
extracts a ground candidate area from the sports broadcasting video according to an extraction reference range of an HSV model,
estimates a convex hull in which a contour of the extracted ground candidate area is approximated to a plurality of polygons as the ground area, and
estimates a ratio of an area occupied by the estimated ground area in the area of the sports broadcasting video as the area ratio.

4. The advertisement analysis system for a sports broadcasting video using artificial intelligence of claim 2, wherein the object detection unit
detects a bounding box for each of objects which exist in the sports broadcasting video, and a bounding box for a specific part of each of the objects and a mask contour of each of the objects by using an object recognition API, and
calculates an average height of the bounding box of each of the detected objects as the height of the detected object.

5. The advertisement analysis system for a sports broadcasting video using artificial intelligence of claim 2, wherein the zoom determination unit
determines the scene as a zoom-out scene when the height of the object calculated by the object detection unit is less than a minimum height reference value,
determines the scene as a zoom-in scene when the height of the object calculated by the object detection unit is more than a maximum height reference value, and
determines the scene as a zoom-normal scene when the height of the object calculated by the object detection unit has a value between the minimum height reference value and the maximum height reference value, and the area ratio estimated by the ground estimation unit is equal to or more than a predetermined area reference value.

6. The advertisement analysis system for a sports broadcasting video using artificial intelligence of claim 1, wherein the advertisement judgment module includes
an advertisement region generation unit generating the advertisement region in the sports broadcasting video according to the determined scene,
an advertisement image detection unit detecting a figure and a text which exit in the generated advertisement region as the advertisement image,
an advertisement classification unit classifying the detected advertisement image according to the advertisement type of the generated advertisement region, and
an advertisement matching judgment unit comparing the classified advertisement image and an official advertisement stored in a data set and judging whether the classified advertisement image matches the official advertisement.

7. The advertisement analysis system for a sports broadcasting video using artificial intelligence of claim 6, wherein the advertisement region generation unit
generates, as the advertisement region, at least any one of a central stand advertisement region, a left stand advertisement region, a left ground advertisement region, a right stand region, and a right ground advertisement region based on the ground area estimated by the scene determination module when the determined scene is a zoom-normal scene, and
generates an area other than a face bounding box in the mask contour of the object detected by the scene determination module as the advertisement region when the determined scene is a zoom-in scene.

8. The advertisement analysis system for a sports broadcasting video using artificial intelligence of claim 6, wherein the advertisement image detection unit
detects the figure by extracting a feature in the advertisement region by using a local feature detect method, and
detects the text by using an individual text and a word text from the figure by using a region score and affinity score based text detection method.

9. The advertisement analysis system for a sports broadcasting video using artificial intelligence of claim 6, wherein the advertisement classification unit
groups and classifies the detected advertisement image according to a distance from a boundary line of the estimated ground area when the determined scene is the zoom-normal scene, and
classifies the detected advertisement image as an apparel advertisement when the determined scene is the zoom-in scene.

10. The advertisement analysis system for a sports broadcasting video using artificial intelligence of claim 6, wherein the advertisement matching judgment unit
selects a proximate feature of a predetermined reference value or more by comparing a feature of the advertisement image classified by the advertisement classification unit and a feature of a reference image of the official advertisement stored in the data set by using a K-NN classification algorithm,
performs predetermined scoring for the feature of the advertisement image, and the feature of the reference image and the proximate feature, and
judges that the advertisement image classified by the advertisement classification unit matches the official advertisement when the scoring value is equal to or more than the predetermined reference value.

11. The advertisement analysis system for a sports broadcasting video using artificial intelligence of claim 1, wherein the advertisement effect analysis module includes
an effect analysis unit calculating, as the analysis result, an accumulated exposure period of time, the number of accumulated exposure times, and an effect amount of money of the advertisement image judged to be the official advertisement by the advertisement judgment module, and
a display unit displaying the analysis result calculated by the effect analysis unit in the sports broadcasting video in real time.

12. An advertisement analysis method for a sports broadcasting video using artificial intelligence, the method comprising:
estimating, by a ground estimation unit, a ground area and an area ratio occupied by the ground area in a sports broadcasting video;
detecting, by an object detection unit, one or more objects in the sports broadcasting video, and calculating an average height of bounding boxes for the detected objects as an object height;
determining, by a zoom determination unit, a scene of the sports broadcasting video according to the area ratio estimated by the ground area estimation unit and the object height calculated by the object detection unit;
determining, by an advertisement region generation unit, whether the object detected by the object detection unit is capable of including an advertisement region, and generating the advertisement region in the sports broadcasting video according to whether the determined scene and the detected object are capable of including the advertisement region;

detecting, by an advertisement image detection unit, an advertisement image which exists in the generated advertisement region, and providing a feature of the detected advertisement image and a feature of a reference image stored in a data set to an advertisement matching judgment unit;

classifying, by an advertisement classification unit, the detected advertisement image according to an advertisement type of the generated advertisement region and transmitting the classified advertisement image to the advertisement matching judgment unit;

judging, by the advertisement matching judgment unit, whether the classified advertisement image matches an official advertisement by comparing the feature of the provided advertisement image and the feature of the reference image;

calculating, by an effect analysis unit, as the analysis result, an accumulated exposure period of time, the number of accumulated exposure times, and an effect amount of money of the advertisement image matching the official advertisement; and displaying, by a display unit, the analysis result analyzed by the effect analysis unit in the sports broadcasting video in real time.

\* \* \* \* \*